A. M. SONNICHSEN.
FASTENING FOR BUMPERS.
APPLICATION FILED SEPT. 11, 1913.
1,088,471.
Patented Feb. 24, 1914.
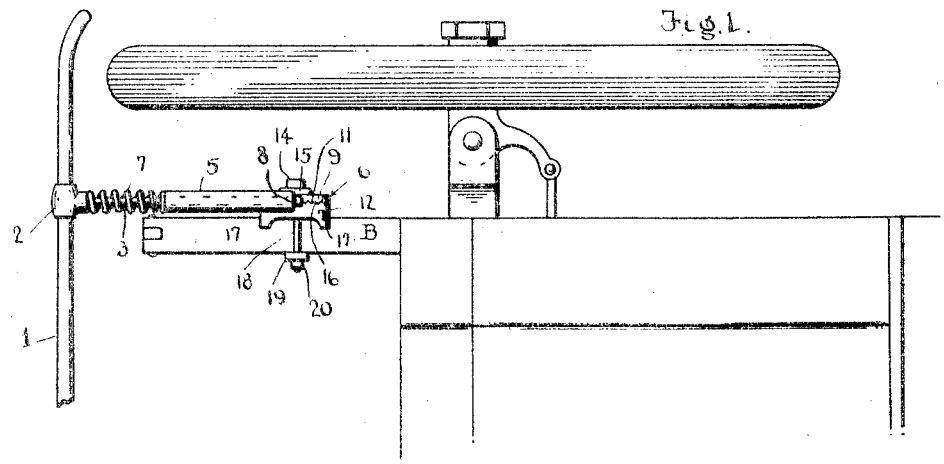
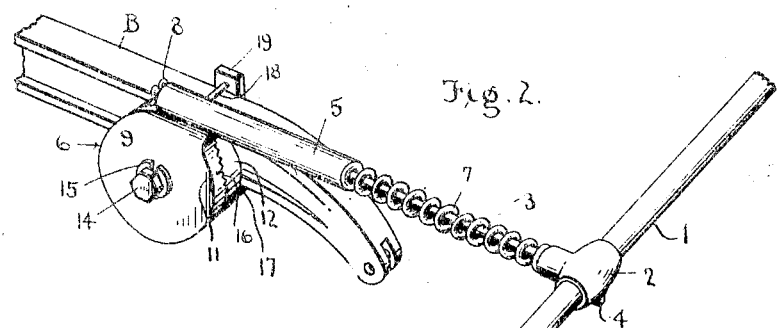
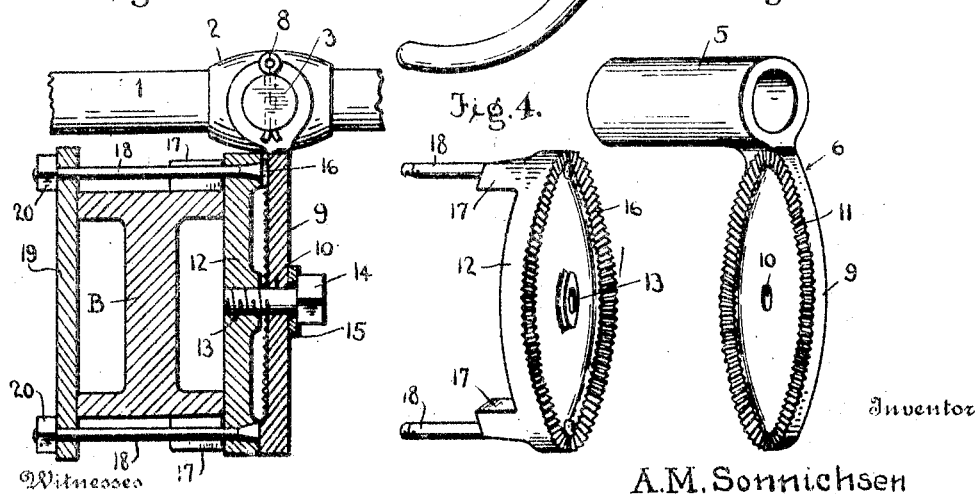
Witnesses
Inventor
A. M. Sonnichsen

UNITED STATES PATENT OFFICE.

ANDREAS M. SONNICHSEN, OF MILWAUKEE, WISCONSIN, ASSIGNOR TO AUTO PARTS MANUFACTURING COMPANY, OF MILWAUKEE, WISCONSIN.

FASTENING FOR BUMPERS.

1,088,471.  Specification of Letters Patent.  Patented Feb. 24, 1914.

Application filed September 11, 1913. Serial No. 789,362.

*To all whom it may concern:*

Be it known that I, ANDREAS M. SONNICHSEN, a citizen of the United States, residing at Milwaukee, in the county of Milwaukee and State of Wisconsin, have invented certain new and useful Improvements in Fastenings for Bumpers; and I do declare the following to be a full, clear, and exact description of the invention, such as will enable others skilled in the art to which it appertains to make and use the same.

This invention relates to improvements in fastenings for the bumpers of motor vehicles.

One object of the invention is to provide a bumper fastening which may be readily applied to the frame of any motor vehicle to secure the bumper in place thereon.

Another object is to provide a fastening for bumpers which may be adjusted to support the bumper at any desired position.

A further object is to provide a fastening of this character which will be simple, strong, durable and inexpensive in construction, efficient and reliable in operation and well adapted to the purpose for which it is designed.

With these and other objects in view, the invention consists of certain novel features of construction, and the combination and arrangement of parts as will be more fully described and claimed.

In the accompanying drawings: Figure 1 is a plan view of a portion of the front end of a motor vehicle showing the application of the invention for fastening the bumper to the frame of the vehicle. Fig. 2 is a detail perspective view of the forward end of one of the side bars of the chassis or supporting frame of the vehicle and one end of the bumper showing the latter secured to the side bar of my improved fastening. Fig. 3 is an enlarged vertical cross section through the supporting bar of the frame and through my improved fastening. Fig. 4 is a detail perspective view of the inner bar engaging member of the fastening. Fig. 5 is a similar view of the outer or bracket member of the fastening.

Referring more particularly to the drawings, 1 denotes the bumper or buffer bar which may be of the usual construction and which is disposed in front of the vehicle in the usual manner. The bumper 1 has adjustably secured thereto near its ends T-coupling 2 in the rearwardly extending branch of each of which is secured a buffer bar supporting and guiding rod 3. The coupling 2 is adjustably secured to the bumper bar 1 by a set screw or other suitable fastening device 4. The supporting rod 3 has a sliding engagement at its inner end with a sleeve or tubular guiding and supporting member 5 of a buffer supporting bracket 6 which forms part of my improved fastening. Arranged on the supporting rod 3 between the outer end of the sleeve 5 and the inner end of the coupling 2 is a coiled buffer spring 7 which yieldingly projects and holds the rod 3 and the bumper bar 1 in a projected position and absorbs the shocks which are produced when the bumper rod is brought into forcible engagement with an obstruction. The rod 3 extends entirely through the sleeve 5 and is held in operative engagement therewith by a cotter pin 8 or similar fastening arranged through the inner end of the rod as shown.

My improved fastening comprises the bracket 6, hereinbefore mentioned, and in addition to the sleeve or tubular member 5 consists of a flat circular plate or disk 9 which is formed integral with the sleeve 5 and has therein a centrally disposed bolt hole 10. On the inner side of the plate or disk 9 and around the outer edge of the plate is an annular series of teeth or corrugations 11 the purpose of which will be hereinafter described. The attaching member of the fastening with which the bracket 6 co-acts comprises a circular plate or disk 12 having therein a centrally disposed bolt hole 13 which is threaded to receive a fastening bolt 14 which is also engaged with the bolt hole 10 in the plate 9 of the bracket member 6 and which securely clamps the members of the fastening together. The bolt 14 is preferably provided with a locking washer 15 whereby the casual unscrewing of the bolt is prevented. The plate 12 is provided on its outer surface with an annular series of teeth or corrugations 16 which co-act with the teeth or corrugations 11 in the plate 9 and rigidly hold these parts in operative engagement when clamped together by the bolt 14. By providing the plates 9 and 12 with the corrugations or teeth as herein shown and described it will be seen that the bracket member 6 of the fastening may be adjusted to hold the sleeve 5 at any desired angle and thereby support the bumper at any desired elevation in front of the vehicle.

On the inner side of the plate 12 of the attaching member of the fastening are formed upper and lower pairs of parallel right angularly projecting supporting lugs 17 which are adapted to engage the upper and lower sides of the side bars B of the supporting frame or chassis of the vehicle as shown. The attaching plate 12 is securely clamped to the bar B by upper and lower clamping bolts 18 which have their headed ends counter-sunk and rigidly secured in the plate 12 and which project inwardly from said plate above and below the bar B as shown. With the threaded ends of the bolts 18 is engaged a clamping plate 19, said plate being drawn into tight clamping engagement with the bar B of the vehicle frame by clamping nuts 20 which are screwed onto the threaded ends of the bolts 18 as clearly shown in Figs. 1 and 4 of the drawing. The plate 19 when thus arranged co-acts with the plate 12 of the fastening to rigidly secure the latter to the bar B for attaching the bracket member 6 thereto at any desired position, thereby supporting the bumper bar at the desired distance in front of the vehicle.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

In a bumper for motor vehicles, the combination with a bumper bar and its supporting rod of a fastening comprising a bracket member consisting of a plate, a guiding and supporting sleeve formed thereon and adapted to receive the supporting rod of the bumper bar, said rod having a sliding engagement with the sleeve, a spring arranged on said rod to yieldingly hold the bumper bar in a projected position, and an attaching member comprising a plate, frame engaging lugs formed on said plate and adapted to be engaged with the side bar of the vehicle frame, clamping bolts secured in said plate and projecting above and below said side bars, a clamping plate engaged with said bolts and with the opposite side of the bar from that with which said plate is engaged, clamping nuts adapted to be screwed onto said bolts to draw said plates in tight clamping engagement with the side bar, and a bolt to secure the plates of said bracket member and attaching member of the fastening in adjustable and detachable engagement.

In testimony whereof I have hereunto set my hand in presence of two subscribing witnesses.

ANDREAS M. SONNICHSEN.

Witnesses:
H. F. FRIEDRICH,
GERTRUDE HOEY.